United States Patent
Egles

[15] 3,645,031
[45] Feb. 29, 1972

[54] TROLLING RIG

[72] Inventor: Richard A. Egles, 310 East 37th St., Hialeah, Fla.

[22] Filed: Mar. 24, 1970

[21] Appl. No.: 22,244

[52] U.S. Cl. ..................................................43/44.2
[51] Int. Cl. ........................................................A01k 83/06
[58] Field of Search ...................................43/44.4, 44.2, 41

[56] References Cited

UNITED STATES PATENTS

| | | |
|---|---|---|
| 2,518,593 | 8/1950 | Bell ..........................................43/44.2 |
| 2,557,577 | 6/1951 | Soma ........................................43/41 |
| 2,763,086 | 9/1956 | Johnson et al. ........................43/44.2 |
| 2,196,376 | 4/1940 | Anderson ...............................43/44.2 |

*Primary Examiner*—Samuel Koren
*Assistant Examiner*—Daniel J. Leach
*Attorney*—Salvatore G. Militana

[57] ABSTRACT

A trolling rig for bait fishing having a substantially frustoconical-shaped cap with an oval cross section adapted to receive the head of the bait fish. The smaller end portion of the cap has an opening at its upper side, and a safety-pin snap is connected to the opening. An opening is provided on each side of the cap at the larger end portion and a fish locking pin extends through the openings and the head of the fish, securing the fish to the cap. A further opening is formed in the lower side at the larger end of the cap and a flexible member is connected at one end to the further opening with a fishhook connected to its free end.

2 Claims, 5 Drawing Figures

Patented Feb. 29, 1972

3,645,031

INVENTOR
RICHARD A. EGLES
BY
Salvatore G. Militana,
ATTORNEY

TROLLING RIG

This invention relates generally to fishing equipment and is more particularly directed to bait fish holders.

A principal object of the present invention is to provide a trolling rig to which a bait fish is attached quickly and easily under conditions that are normally adverse and while trolling, the bait fish assumes realistic and lifelike motions that entice fish to attack same.

Another object of the present invention is to provide a bait fish holder having a cap which receives the head of a bait fish with a locking pin locking the bait in position but permitting the fish to perform in the same manner as a normal fish as it swims thereby simulating a live and healthy fish and preserving this condition for extended periods of time.

A further object of the present invention is to provide a bait fish holder for trolling wherein the bait fish is held securely but not rigidly, thereby permitting the bait fish to undulate from side to side as it is being trolled in the manner of a live fish to entice fish to strike at the bait.

A still further object of the present invention is to provide a deep diving bait fish holder which is simple in construction, easy to rig with bait fish and one which will simulate a live fish at great depths in the water for catching large fish.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified as such changes or modifications mark no material departure from the salient features of the invention as expressed in the appended claims.

Figure 1:
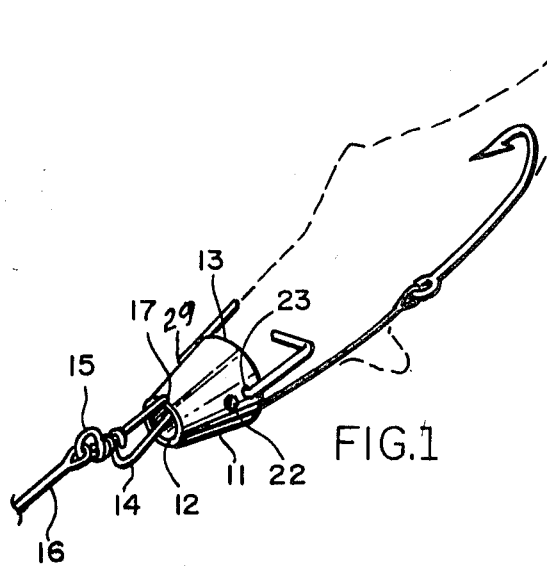
FIG. 1 is a perspective view of a trolling rig constructed in accordance with my invention and shown with a bait fish in position in dotted lines.
Figure 4:
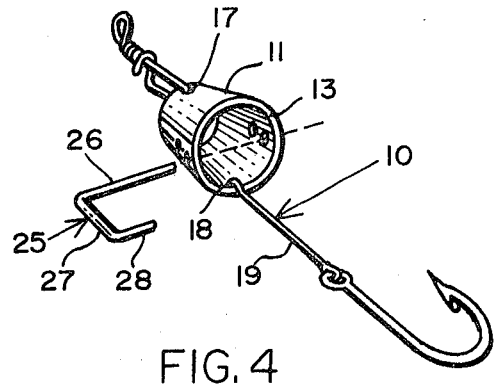
FIG. 4 is a perspective view thereof shown with the locking pin prior to insertion into the cap thereof.
Figure 2:
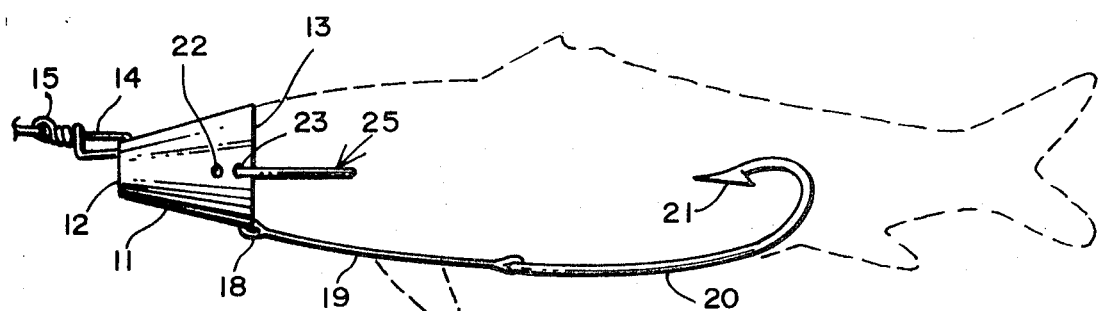
FIG. 2 is a side elevational view.

Referring to the drawing wherein like numerals are used to designate similar parts throughout the several views, the numeral 10 refers to a trolling rig constructed in accordance with my invention and consisting of a hollow frustoconical-shaped cap or muzzle 11 being open at both ends 12 and 13 and of slightly oval-shaped cross section for receiving the head of a fish as shown by FIGS. 1 and 2.

At the smaller end 12 of the cap 11 at the upper portion thereof is an opening 17 for receiving one end of a safety-pin snap 14 which is provided with a loop 15 to which a fishing line 16 is attached. At the larger end 13 of the cap 11 and on the lower portion thereof is an opening 18 to which a leader wire 19 is secured at one end. At the other end of the leader wire 19 there is a fishhook 20 attached thereto, the hook 20 lying vertically with the barb 21 extending upwardly and lying in a plane passing through the openings 17 and 18. At the rear edge of the cap 11 along each side is a pair of aligned openings 22, 23 for receiving a locking pin 25 therethrough.

The locking pin 25 is an L-shaped pin consisting of a main portion 26, a leg portion 27 extending at a right angle thereto and a foot or prong portion 28 at a right angle to the leg portion 27 extending in the same direction and in coplanar relation with the main portion 26.

Figure 3:
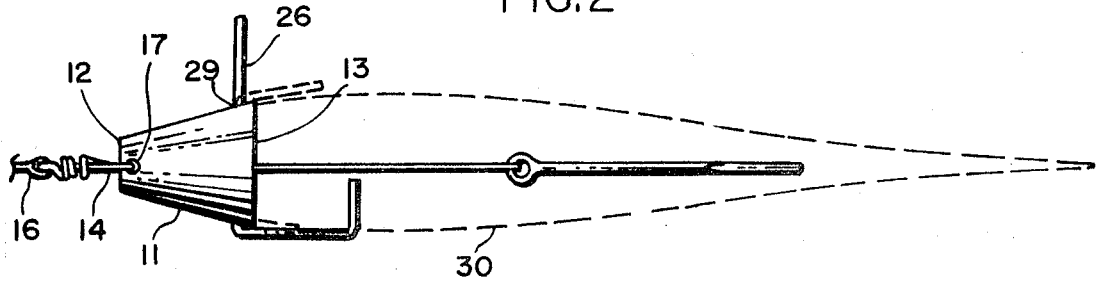
FIG. 3 is a top plan view.

In the normal use of my trolling rig 10, a bait fish 30 is taken in hand and the head of the fish 30 is inserted into the cap 11. The main portion 26 of the locking pin 25 is then inserted into one of the openings 22 or 23 depending upon where the eyes of the fish are positioned so that the pointed end of the main portion 26 will easily pierce through the head of the fish; otherwise, the skull of the fish will have to be pierced by the locking pin 25. As the main portion 26 emerges from the other side of cap 11 having passed through the opposite aligned opening 22 or 23, the foot or prong portion 28 will pass into the side of the fish 30 as shown by FIG. 3. The main portion 26 which extends beyond the cap 11 is bent as at 29 and brought into contact relation with the side of the bait fish 30. The hook 21 is then inserted into the rear portion of the fish 30 and the trolling rig 10 is now ready to be put into the water and trolled when connected to the fishing line 16. With the fishing line 16 extending from the safety-pin snap 14 which in turn is connected to the upper portion of the cap 11, there is a tendency for the bait fish 30 to be trolled close to the surface of the water.

Figure 5:
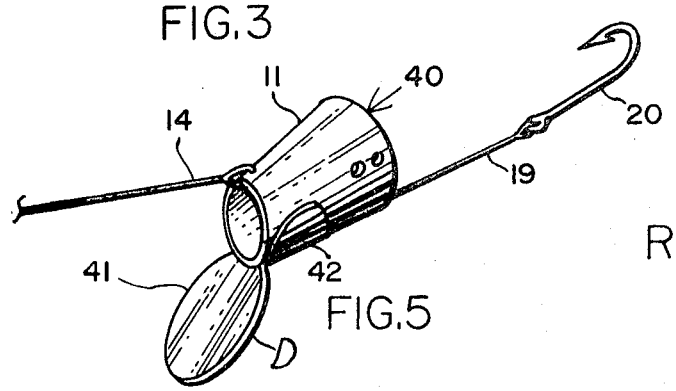
FIG. 5 is a perspective view of an alternate construction illustrating a deep diving trolling rig.

If it is desired to troll deep in the water, I provide a deep diving trolling rig 40 (FIG. 5) which is identical to my previously described trolling rig 10 except for a deflector member -D- mounted on the forward or smaller end portion 12 of the cap 11. The deflector member -D- consists of a deflector blade 41 extending forwardly of the cap 11 and a support plate 42 extending rearwardly and attached as by soldering to the sides of the cap 11. The deflector blade 41 is set at such an angle with relation to the axis of the cone-shaped cap 11 that as the trolling rig 40 moves forwardly in the water, the water impinges on the upper surface of the deflector blade 41 causing the nose or forward end 12 to be tilted downwardly and the trolling rig 40 to move to the lower depths of the water.

What I claim and desire to secure by Letters Patent of the United States is:

1. A trolling rig for bait fishing comprising a substantially frustoconical hollow cap adapted to receive the head of a bait fish, means connecting a fishing line to the upper portion of said cap at its smaller end portion, further means connecting a flexible member at one end to the lower portion of said cap at its larger end portion, a fishhook secured to the free end of said flexible member, said hollow cap having a plurality of aligned openings on its sidewalls adjacent the larger end portion, an elongated fish locking member having a substantially U-shape with one of its legs being longer than the other, the longer leg being received by a pair of said aligned openings and extending through the head of said fish, the shorter leg extending into said fish and the free end of said longer leg being bent and lying alongside and in substantial contact relation with said fish to secure said fish to said hollow cap.

2. The structure as recited by claim 1 wherein said fish locking means comprises a pin having a substantially U-shape with one of its legs being longer than the other, a plurality of openings on the sides of said cap adjacent the larger end portion, said openings receiving said one of said legs with said other of said legs being received by said fish and the free end of said one of said legs being bent and lying alongside and in substantial contact relation with said fish.

* * * * *